United States Patent
Bar On et al.

(10) Patent No.: US 12,481,715 B2
(45) Date of Patent: Nov. 25, 2025

(54) SEMANTIC MEANING ASSOCIATION TO COMPONENTS OF DIGITAL CONTENT

(71) Applicant: Taboola.com Ltd., Ramat Gan (IL)

(72) Inventors: Yotam Bar On, Rosh Ha'ayin (IL); Yonatan Schvimer, Tel Aviv (IL); Or Yaniv, Petah-Tikva (IL); Avi Yungelson, Haifa (IL)

(73) Assignee: Taboola.com Ltd., Ramat Gan (IL)

( * ) Notice: Subject to any disclaimer, the term of this patent is extended or adjusted under 35 U.S.C. 154(b) by 0 days.

(21) Appl. No.: 18/638,358

(22) Filed: Apr. 17, 2024

(65) Prior Publication Data

US 2024/0265060 A1    Aug. 8, 2024

Related U.S. Application Data

(63) Continuation of application No. 17/471,397, filed on Sep. 10, 2021, now Pat. No. 11,989,254.

(60) Provisional application No. 63/076,776, filed on Sep. 10, 2020.

(51) Int. Cl.
| | |
|---|---|
| *G06F 16/958* | (2019.01) |
| *G06F 16/951* | (2019.01) |
| *G06F 16/953* | (2019.01) |
| *G06F 40/30* | (2020.01) |
| *G06V 20/40* | (2022.01) |

(52) U.S. Cl.
CPC .......... *G06F 16/958* (2019.01); *G06F 16/951* (2019.01); *G06F 16/953* (2019.01); *G06F 40/30* (2020.01); *G06V 20/41* (2022.01)

(58) Field of Classification Search
CPC .... G06F 16/958; G06F 16/953; G06F 16/951; G06F 40/30; G06V 20/41
See application file for complete search history.

(56) References Cited

U.S. PATENT DOCUMENTS

| | | | | |
|---|---|---|---|---|
| 5,704,053 | A * | 12/1997 | Santhanam | G06F 9/383 |
| | | | | 712/E9.047 |
| 6,408,428 | B1 * | 6/2002 | Schlansker | G06F 30/30 |
| | | | | 716/135 |
| 6,847,980 | B1 * | 1/2005 | Benitez | G06F 16/71 |
| | | | | 707/916 |
| 9,298,816 | B2 * | 3/2016 | Dimassimo | G06F 16/36 |
| 10,289,727 | B2 * | 5/2019 | Bostick | G06F 16/9536 |
| 10,915,701 | B2 * | 2/2021 | Sodhani | G06F 40/216 |
| 12,094,018 | B1 * | 9/2024 | O'Malley | G06N 20/00 |
| 2003/0237053 | A1 * | 12/2003 | Chen | G06F 16/9577 |
| | | | | 707/E17.121 |

(Continued)

*Primary Examiner* — Mark E Hershley
(74) *Attorney, Agent, or Firm* — Myers Wolin, LLC

(57) ABSTRACT

A method, system, apparatus and product for semantic meaning association to components of digital content. The method comprising obtaining a digital content, which comprises multiple visually separated components. The method comprises analyzing at least a portion of the digital content to extract features associated with a component and automatically determining, based on the extracted features, a semantic meaning of the component. The automatic determination is performed without relying on manually inputted hints in the digital content. The method further comprises automatically and without user intervention, performing an action associated with the digital content, wherein the action is determined based on the semantic meaning.

25 Claims, 9 Drawing Sheets

(56) References Cited

U.S. PATENT DOCUMENTS

| | | | | |
|---|---|---|---|---|
| 2005/0060129 | A1* | 3/2005 | Mosterman | G06F 17/10 |
| | | | | 703/2 |
| 2008/0319947 | A1* | 12/2008 | Latzina | G06F 16/334 |
| 2009/0254572 | A1* | 10/2009 | Redlich | G06Q 10/10 |
| 2010/0070448 | A1* | 3/2010 | Omoigui | H10F 39/1825 |
| | | | | 706/55 |
| 2010/0121630 | A1* | 5/2010 | Mende | G06F 40/30 |
| | | | | 704/7 |
| 2010/0211580 | A1* | 8/2010 | Sreekanth | G06F 8/10 |
| | | | | 707/756 |
| 2011/0213655 | A1* | 9/2011 | Henkin | G06Q 30/00 |
| | | | | 707/E17.061 |
| 2012/0042000 | A1* | 2/2012 | Heins | G06Q 10/10 |
| | | | | 709/201 |
| 2012/0150666 | A1* | 6/2012 | Savic | G06Q 30/0283 |
| | | | | 705/26.41 |
| 2013/0024440 | A1* | 1/2013 | Dimassimo | G06F 16/951 |
| | | | | 707/706 |
| 2013/0073280 | A1* | 3/2013 | O'Neil | G06F 40/20 |
| | | | | 704/E11.001 |
| 2013/0073388 | A1* | 3/2013 | Heath | G06Q 50/01 |
| | | | | 705/14.53 |
| 2013/0073568 | A1* | 3/2013 | Federov | G06Q 30/0269 |
| | | | | 707/E17.069 |
| 2013/0080426 | A1* | 3/2013 | Chen | G06F 16/5866 |
| | | | | 707/723 |
| 2013/0091416 | A1* | 4/2013 | Villoslada De La Torre | G06F 40/143 |
| | | | | 715/234 |
| 2013/0191723 | A1* | 7/2013 | Pappas | G06F 40/143 |
| | | | | 715/234 |
| 2013/0311875 | A1* | 11/2013 | Pappas | G06F 40/143 |
| | | | | 715/234 |
| 2015/0074516 | A1* | 3/2015 | Ben-Aharon | G06F 16/9577 |
| | | | | 715/234 |
| 2015/0169987 | A1* | 6/2015 | Nalawadi | G06V 20/20 |
| | | | | 382/181 |
| 2015/0206169 | A1* | 7/2015 | Ye | G06Q 30/0242 |
| | | | | 705/14.41 |
| 2015/0294377 | A1* | 10/2015 | Chow | G06Q 30/0263 |
| | | | | 705/347 |
| 2016/0026349 | A1* | 1/2016 | Kurata | H04W 4/029 |
| | | | | 715/771 |
| 2017/0004129 | A1* | 1/2017 | Shalaby | G06F 40/242 |
| 2017/0032138 | A1* | 2/2017 | Navda | G06F 21/6218 |
| 2017/0034654 | A1* | 2/2017 | Oberbeck | H04N 21/6405 |
| 2018/0012358 | A1* | 1/2018 | Varkuti | G06T 7/0014 |
| 2018/0032626 | A1* | 2/2018 | Ben-Aharon | G06F 40/103 |
| 2018/0052898 | A1* | 2/2018 | Allan | G06F 40/30 |
| 2018/0314689 | A1* | 11/2018 | Wang | G10L 15/1822 |
| 2020/0250230 | A1* | 8/2020 | Abhyankar | G06F 16/9535 |
| 2020/0401935 | A1* | 12/2020 | Malhotra | G06N 5/04 |
| 2021/0056251 | A1* | 2/2021 | Parmar | G06F 3/04847 |
| 2021/0294724 | A1* | 9/2021 | Muppalla | G06F 11/3692 |
| 2022/0261856 | A1* | 8/2022 | Korhov | G06Q 30/0641 |
| 2022/0276847 | A1* | 9/2022 | Pope | G06F 8/458 |

* cited by examiner

SEMANTIC MEANING ASSOCIATION TO COMPONENTS OF DIGITAL CONTENT

CROSS-REFERENCE TO RELATED APPLICATION

This application is a continuation of and claims the benefit U.S. patent application Ser. No. 17/471,397, entitled "SEMANTIC MEANING ASSOCIATION TO COMPONENTS OF DIGITAL CONTENT", filed Sep. 10, 2021, which claims the benefit of provisional patent application No. 63/076,776, entitled "SEMANTIC MEANING ASSOCIATION TO COMPONENTS OF DIGITAL CONTENT", filed Sep. 10, 2020, all of which are hereby incorporated by reference in their entirety without giving rise to disavowment.

TECHNICAL FIELD

The present disclosure relates to analysis of digital content in general, and to automatic analysis of components in digital content, in particular.

BACKGROUND

Integrating web-based components into existing webpages is a widely used technique for different purposes, such as online advertising, providing reading recommendations, integrating social media widgets, e.g., enabling users to share content with their social connections, integrating analytics tools, page personalization tools, accessibility tools, or the like.

Many factors are considered when integrating web-based components, such as adapting the content to the website users, the content each user is viewing, the content's length and metadata, the user's history, and the like.

In addition, other features and considerations should be taken when integrating the web-based components, such as enabling publishers to remove offensive content and vet ads before they are displayed, enabling users to filter out recommendations they do not want to see, extending more features to mobile devices, user-generated content, and apps, and the like.

BRIEF SUMMARY

One exemplary embodiment of the disclosed subject matter is a method comprising obtaining a digital content, the digital content comprises multiple visually separated components, wherein the multiple visually separated components comprise a component; analyzing at least a portion of the digital content to extract features associated with the component; automatically determining, based on the extracted features, a semantic meaning of the component, wherein said automatically determining is performed without relying on manually inputted hints in the digital content; and automatically and without user intervention, performing an action associated with the digital content, wherein the action is determined based on the semantic meaning.

Another exemplary embodiment of the disclosed subject matter is an apparatus having a processor, the processor being adapted to perform the steps of: obtaining a digital content, the digital content comprises multiple visually separated components, wherein the multiple visually separated components comprise a component; analyzing at least a portion of the digital content to extract features associated with the component; automatically determining, based on the extracted features, a semantic meaning of the component, wherein said automatically determining is performed without relying on manually inputted hints in the digital content; and automatically and without user intervention, performing an action associated with the digital content, wherein the action is determined based on the semantic meaning.

Yet another exemplary embodiment of the disclosed subject matter is a computer program product comprising a non-transitory computer readable storage medium retaining program instructions, which program instructions when read by a processor, cause the processor to perform a method comprising: obtaining a digital content, the digital content comprises multiple visually separated components, wherein the multiple visually separated components comprise a component; analyzing at least a portion of the digital content to extract features associated with the component; automatically determining, based on the extracted features, a semantic meaning of the component, wherein said automatically determining is performed without relying on manually inputted hints in the digital content; and automatically and without user intervention, performing an action associated with the digital content, wherein the action is determined based on the semantic meaning.

Additionally or alternatively, the multiple visually separated components further comprise a second component, wherein said automatically determining the semantic meaning comprises: determining, based on the extracted features, a second semantic meaning of the second component; and determining the semantic meaning of the component based on the second semantic meaning of the second component.

Additionally or alternatively, said automatically determining the semantic meaning of the component is performed based on a relative location, within a rendered graphical representation of the digital content, of the component with respect to the second component.

Additionally or alternatively, said automatically determining comprises: determining for the component, a set of candidate semantic meanings related to the component and respective likelihoods of the component having each candidate semantic meaning, wherein the set of candidate semantic meanings comprises the semantic meaning having a first likelihood and the second semantic meaning having a second likelihood, wherein the first likelihood is lower than the second likelihood; determining for the second component a third likelihood of the second component having the second semantic meaning, wherein the third component is higher than the second likelihood; and based on the second likelihood and the third likelihood, determining that the component has the semantic meaning.

Additionally or alternatively, determining, based on said analyzing, a type of the digital content; wherein said automatically determining the semantic meaning of the component is further performed based on the type of the digital content.

Additionally or alternatively, determining, based on the type of the digital content, that the digital content is configured to comprise a second component associated with a unique semantic meaning, wherein the digital content comprises exactly one component that is associated with the unique semantic meaning; wherein said automatically determining the semantic meaning of the component is performed based on a relation between the second component and the component.

Additionally or alternatively, the type of the digital content is an article page, wherein the unique semantic meaning is a main article of the article page.

Additionally or alternatively, the type of digital content is a search results page, wherein the unique semantic meaning is a search widget of the search results page.

Additionally or alternatively, the action comprises automatically integrating a visible element into the digital content, whereby presenting to a user consuming the digital content a modified representation of the digital content.

Additionally or alternatively, said automatically integrating the visible element into the digital content is performed in accordance with one or more display parameters, wherein the one or more display parameters are determined based on the semantic meaning of the component.

Additionally or alternatively, said automatically integrating comprises: determining, based on the semantic meaning of the component, a location within the digital content to integrate the visible element, wherein the location is determined based on a relative location to a location of the component; and causing the visible element to be integrated in the location within the digital content.

Additionally or alternatively, said determining the location comprises: determining a plurality of alternative locations within the digital content suitable for integrating the visible element; and prioritizing between the plurality of alternative locations based on relative location thereof to the component.

Additionally or alternatively, the action comprises: obtaining a pre-determined requirement for components having the semantic meaning; automatically determining that the component does not meet the pre-determined requirement; and reporting infringement of the pre-determined requirement.

Additionally or alternatively, the pre-determined requirement comprises at least one of: an ornamental requirement and a logical requirement.

Additionally or alternatively, the semantic meaning is associated with at least one of: intended functionality of the component, intended visual role of the component, intended relation to a content topic of the component.

Additionally or alternatively, said automatically determining the semantic meaning is performed based on at least one of the following rules: a relative size of the component compared to other components of the multiple visually separated components; a relative location compared to another component having a meaning of a title of an article; and existence or lack thereof of one or more images within a content of the component.

Additionally or alternatively, said obtaining the digital content comprises obtaining a first version of the digital content, wherein said analyzing the at least portion of the digital content and said automatically determining the semantic meaning of the component are performed with respect to the first version; wherein the disclosed subject matter further comprises: obtaining a second version of the digital content, wherein the second version is obtained after the semantic meaning of the component is determined; and wherein the action is performed with respect to the second version of the digital content.

Additionally or alternatively, determining the at least portion of the digital content to be analyzed for extracting the features, wherein the at least portion of the digital content excludes at least a remaining portion of the digital content, whereby avoiding analyzing an entirety of the digital content.

Additionally or alternatively, the digital content is a dynamic digital content having different versions over time.

Additionally or alternatively, determining, based on properties of the dynamic digital content, a timing for performing said analyzing; and in response to reaching the timing, performing said analyzing.

Additionally or alternatively, the multiple visually separated components comprise a second component, wherein the component and the second component are visually similar, wherein the semantic meaning is different than a semantic meaning of the second component.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
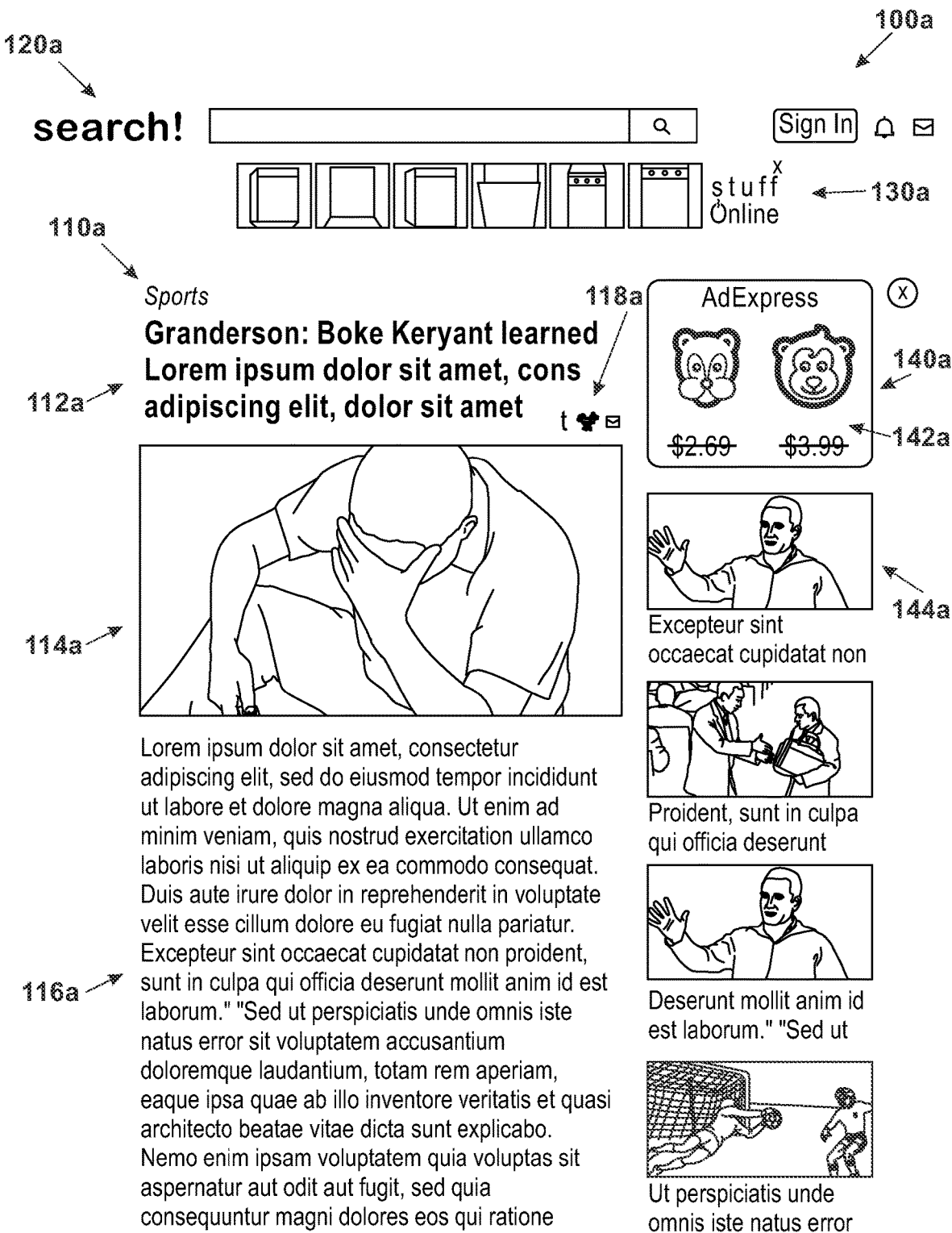
FIGS. 1A-1D show schematic illustration of exemplary digital contents, in accordance with some exemplary embodiments of the disclosed subject matter.

One technical problem dealt with by the disclosed subject matter is to automatically integrate web-based components into an existing webpage in an efficient and suitable manner. In some exemplary embodiments, integration of additional elements such as web-based components into third-party websites may require substantial human labor of engineers and other developers. During the integration, a developer may be required to manually identify where to place the newly integrated element in the webpage. It may be desired to fully or partially automate the integration so as to allow the process to be automatic or semi-automatic once code is added into the website.

In some exemplary embodiments, instead of having a human identify locations in which the components may be added, it may be desired that the identification of such opportunities may be automatic, thereby speeding up and improving the integration of the components into the website. As an example, it may be desired to automatically identify an opportunity to insert an ad unit component to a webpage, an opportunity to add social interaction widgets into a website, or the like. It may be desired to identify a plurality of different alternative opportunities for the same webpage and prioritize between them.

In some exemplary embodiments, the automated integration may also be aimed at providing a personalized user experience (UX) to the user without the involvement of the user herself or the developer. As an example, it may be desired to automatically display a social media widget, such as a FACEBOOK™ "Like" button, for specific users, such as those users identified by the provider of the component or using information provided by the developer of the publisher website, as users that are likely to interact with such widgets.

Another technical problem dealt with by the disclosed subject matter is to automatically ensure websites meet pre-determined requirements, such as derived from requirements, contractual obligations, standards, guidelines, regulations, industry best practices, or the like. In some exemplary embodiments, certain restrictions or preferences are in place as to how and where to place specific components.

Yet another technical problem dealt with by the disclosed subject matter is to provide an automatic analysis of a webpage. It may be desired to crawl webpages and analyze them to identify their subject, their content, or the like. However, the content of the webpage may differ due to some components, such as an endless feed, whose content may exceed that of the main article, and may cause an automatic text analysis to provide an incorrect estimation as to the topic of the webpage. As another example, a webpage including several articles or excerpts thereof may be related to a plurality of subjects or contents.

One technical solution provided by the disclosed subject matter is to automatically or semi-automatically identify semantic meaning of components of the digital content. In some exemplary embodiments, the digital content, such as a webpage, may be determined using different code, such as Hypertext Markup Language (HTML) instructions, Cascading Style Sheets (CSS), JavaScript code, client-side runtime code injecting additional HTML instructions, client-side runtime code invoking third-party services or other requests to servers in real-time, or the like. One end result may be a display of the digital content in a specific logical and/or ornamental layout that is detached from the specific implementation. As an example, some publishers may generate the website pages dynamically, in real-time or on-the-fly, while others may use mostly static pages that may or may not be updated at runtime. The logical layout may be based on a different semantic meaning to different visual components (e.g., blocks that are visually separated in the webpage). As an example, components in the webpage may be visually shown within, in proximity or with visual similarity to other components that are semantically similar or semantically different from them. A component may be associated with a plurality of potential semantic meanings. The disclosed subject matter may be utilized to compute for each semantic meaning a weight, such as representing a likelihood of the component having the semantic meaning. A semantic meaning of a component may depend on the overall context or goals in mind. Some semantic meanings may be related to the intended functionality of components, to the intended visual role of components, to the intended relations to certain content topics, or the like. For example, a component may be associated with the semantic meaning of being a "main" article, a "feed", a "card" in a feed, a header, a lead visual element, a "call to action" widget, a recommendations component, a social component, an ad unit, holding content of different content topic, and the like.

In some exemplary embodiments, an automated tool may be configured to obtain the digital content, e.g., the webpage and analyze it. The automated tool may be configured to separate between different visual elements in accordance with their display. it may be noted that the visual separation may not necessarily be determined based on coding separation. As an example, a tag indicating a new coding element or a new line, such as <p> HTML tag, that defines a new paragraph of text, may be a separated block-level element. A <p> HTML tag added before and after the paragraph, may indicate a separated element as browsers may add margin automatically. However, a <p> HTML tag may not necessarily indicate a new or separated visual element if its content is displayed together with the content of a previous HTML tag.

In some exemplary embodiments, the semantic meaning of each visually separated component may be determined based on features of the component within the digital content. The features may be related to the location of the components within the digital content, the relative location to other components or elements of the digital content, structure of the component, size and shape, pixel distribution, or the like.

Additionally or alternatively, the semantic meaning may be determined based a layout template of the digital content and the location of the component therein. As an example, it may be determined, such as based on the layout template and based on their content, that there is a main article element in the webpage, that the element in the middle of the page is the main article, that the element with a plurality of cards is a feed element, a top menu element, an ad unit, a sidebar, or the like.

In some exemplary embodiments, the automated tool may be configured to obtain only a portion of the digital content for analysis, such as a portion of an endless feed, a portion of a webpage, or the like. Additionally or alternatively, the digital content may dynamically change or continue to be loaded over time. The analysis may be performed on a version of the digital content that may not be a "final" version (if such version exists). In some cases, the non-final version that is analyzed may be a previous or not-up-to-dated version of the digital content, such as the same digital content fetched an hour earlier. As another example, the non-final version may be a version of the digital content before some additional elements are loaded therein to be presented to the user, such as advertisements, dynamically generated content, or the like. As yet another example, the non-final version may be a version of the media content that is obtained and before personalization is applied. In some cases, different users may be presented with different variations of the same digital content, such as having different reading recommendations, having different title or sub-title elements, or the like. The personalization may be determined after a fundamental version is obtained, and after such personalization is applied, a final version to be displayed to the user is generated.

In some exemplary embodiments, the analysis may be based on hard-coded rules, based on hints, or the like. As an example, a hint may that the largest element in the middle of the page is likely the main article. Another hint may be if the visual element has an "Advertisement" or "Sponsored" text next to it, indicating it being an ad unit or a recommendation element. As another example, hints may be obtained from a content publisher, from third-party services, and the like. In some exemplary embodiments, different heuristics may be utilized, such as based on the number of characters or words in an element, based on the semantic meaning of adjacent elements, based on the location of the element, based on sub-elements, their respective location, number, content or the like, based on available buttons and widgets (e.g., X button or "Report Ad" button), based on the HTML tags, attributes or values associated with the component, based on Cascading Style Sheets (CSS) code used by the webpage, based on JavaScript (JS) code used by the webpage, or the like. For example, a client code such as CSS or JS may determine whether and how to display certain elements depending on the circumstances, the screen size, viewport dimensions, user actions, responses from servers, and the like. As an example, if a webpage is configured to possibly hide altogether a certain component in certain circumstances, then the analysis may conclude that this component is less likely to be a "main article".

In some exemplary embodiments, the determination may be based on artificial intelligence techniques such as machine learning, deep learning, artificial neural networks, or the like. In some exemplary embodiments, a labeled dataset may be provided based on manual tagging of semantic meaning to visual elements. Using the labeled dataset, supervised learning may be applied to predict semantic meaning in other pages. The learning mechanism may obtain information such as including the list of visual elements, their respective locations, their content type (such as a text, an image, a video, or the like), the content itself, or the like. A classifier may be accordingly trained to predict a likelihood score of a certain semantic meaning to certain components in future pages. For example, it may be determined with high likelihood that a component is the main article. In some exemplary embodiments, it may be determined that a certain component is likely to not have a certain semantic meaning. For example, a classifier may suggest with high confidence that a certain component is not a "main article". Additionally or alternatively, a classifier may provide a confidence indication in its prediction (e.g., low confidence in its prediction) or not have a prediction altogether of the correct semantic meaning of that component.

In some exemplary embodiments, an action may be performed on the digital content based on the automatically determined semantic meaning. The action may comprise enabling an automatic integration of web-based components into an existing webpage. The existing webpage may be analyzed in accordance with the disclosed subject matter and it may be determined whether, when and where to add a certain new web-based component to the webpage. Certain display parameters and other aspects of the new web-based component may be determined based on the semantic meaning of an existing component. As an example, the analysis may identify the location of the main article and the component may be inserted directly above the main article component (e.g., in the location 130a appears in FIG. 1A). Additionally or alternatively, the location of the new component may be determined to be below one element and above another element, or within an existing element. As yet another example, the location may be to the side of an existing element with a specific semantic meaning. As yet another example, the design or content of the new component may be adapted to be similar to the design or content or the "main article" element, thereby improving the "look and feel" and user experience in the webpage.

In some exemplary embodiments, the action may comprise ensuring that a website meet pre-determined requirements, such as derived from requirements, contractual obligations, or the like. In some exemplary embodiments, certain restrictions are in place as to how and where to place specific components. The restrictions may be provided in a formal language defining a relative position with respect to other components having predetermined semantic meaning. As an example, a recommendation feed may be required to be placed below the main article in the webpage, no more than 100 pixels vertically from the end of the main article. The disclosed subject matter may be employed to automatically analyze the webpage, identify the relevant elements, such as the feed element and the main article element, and verify that the requirement is met. As another example, the restriction may require that each ad unit be displayed with a disclosure nearby, such as "sponsored" or similar text. The disclosed subject matter may be employed to ensure no advertisement is displayed with the required disclosure. In some exemplary embodiments, the website may be automatically crawled repeatedly, such as periodically or in response to a request, and each webpage that is encountered may be analyzed to ensure whether the predetermined restrictions are met.

Additionally or alternatively, the action may comprise analyzing digital content and reporting such analysis. Analytics services, crawling services, or the like may be enabled to utilize the disclosed subject matter to analyze the webpages. In some exemplary embodiments, topic summarization of the webpage may be based on content, e.g., text and media, of elements having specific semantic meaning.

One technical effect of the disclosed subject matter is reducing time and resources required for automated actions on digital content, such as the automatic integration of web-based components. The automatic identification of the semantic meaning of components of the digital content may be performed without input or manual analysis by the user, thus speeding up and improving the action.

Another technical effect of the disclosed subject matter is providing a personalized UX to the user without the involvement of the user herself or the developer. The performed action may be based on the user properties and based on the user's expected behavior in the digital content such as the webpage or the publisher's website. The automatic integration of web-based elements may be automatically adapted to the user, and may consider multiple features that cannot be manually considered. Different users may be provided with different UX that is considered as best suiting each one of them.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1A showing a schematic illustration of an exemplary digital content, in accordance with some exemplary embodiments of the disclosed subject matter.

In some exemplary embodiments, the digital content may be a Webpage 100a. Webpage 100a may comprise multiple visually separated components, such as 110a-140a. Each visually separated component may be associated with a semantic meaning. In some exemplary embodiments, it may be required to automatically analyze Webpage 100a or portions thereof, in order to identify the semantic meanings of the components of Webpage 100a.

In some exemplary embodiments, the semantic meaning of the components may be determined based on a type of Webpage 100a. As an example, Webpage 100a may be an article page, such as a YAHOO™ article page. Component 110a may be determined to have the semantic meaning of "main article" of the webpage.

In some exemplary embodiments, a component may comprise several sub-components, each if which may be associated with a semantic meaning. As an example, Component 110a may comprise Component 112a having the semantic meaning of a title, Component 114a having a semantic meaning associated with main visual element, and Component 116a having a semantic meaning of a content.

In some exemplary embodiments, some components may be visually included in other components but may be semantically independent therefrom. As an example, Component 118a, which has a semantic meaning of a social widget, is visually included in the Component 110a (the main article) but it may be independent therefrom.

Additionally or alternatively, Webpage 100a may comprise other components of interest, such as Component 130a which may be a top ad unit that is used to display an advertisement; or Component 140*a* which may be a sidebar used to display recommendations, such as 142*a* and 144*a*. The semantic meaning of such component may be determined using machine learning, based on features related to their shape, relative location to the main article (Component 110*a*), or the like.

Additionally or alternatively, Webpage 100*a* may comprise anchor components utilized to determine semantic meaning of other components based on the relative location thereto. As an Example, Component 120*a* associated with a "title" of Webpage 100*a* may be ab anchor component indicating that Component 110*a* which is located directly below therefrom is the main article.

Figure 1B:
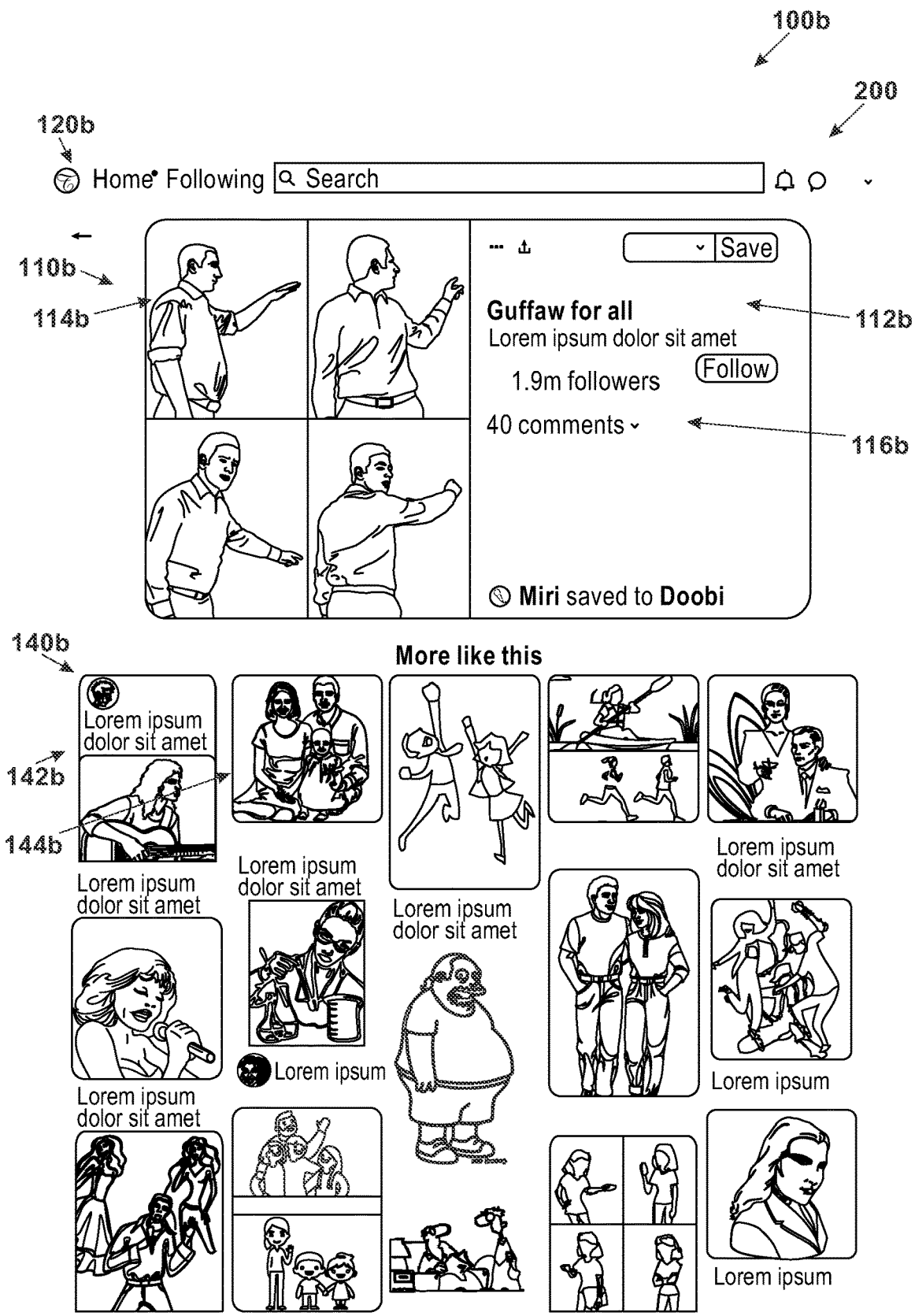

Referring now to FIG. 1B showing a schematic illustration of an exemplary digital content, in accordance with some exemplary embodiments of the disclosed subject matter.

Webpage 100*b* may be an image sharing webpage, or an image search page, such as a PINTEREST™ webpage page, Google™ Images, or the like.

In some exemplary embodiments, a Webpage 100*b* may comprise multiple visually separated components, such as 110*b*-140*b*. Each visually separated component may be associated with a semantic meaning. Component 110*b* may be the main component of Webpage 100*b*. Component 110*b* may comprise sub-components having individual but dependent semantic meaning, such as a Title 112*b*, Main Visual Element 114*b* and Comments 116*b* section. It can be noted that when Comments 116*b* are open, most of the text shown in Main Article 110*b* is not semantically part of the main article itself but is rather user-generated content of commentators.

In some exemplary embodiments, some components may be seeming seemingly infinite. As an example, Component 140*b* may be a recommendation feed that is displayed below the main article (Component 110*b*). Component 140*b* may be configured to show different recommendations that may be organic, sponsored, or the like, such as Recommendations 142*b*, 144*b*.

In some exemplary embodiments, components having a unique semantic meaning may be singular in a page, such as the main article or top menu. Hence, the element most likely to have such semantic meaning may be selected to have that meaning, while all others may be selected different meanings. As an example, the heuristics (e.g. machine learning or the classifier) may indicate that component 110*b* has a likelihood of about 80% of being the main article and a likelihood of 20% of being the feed element, while Component 140*b* has a likelihood of about 75% of being the main article and a likelihood of 70% of being the feed element. Accordingly, Component 110*b* may be assigned with the main article semantic meaning, while Component 140*b* may not be selected to have the semantic meaning of the main article, even though the semantic meaning having the highest likelihood to be associated therewith is the main article meaning. In such a case Component 140*b* may be determined to have the semantic meaning of a feed element.

In some exemplary embodiments, it may be known that an element is located below the main article. For example, the feed element may be positioned in such a manner. Accordingly, the search for a feed element may be limited to the elements below the main article element.

Figure 1C:
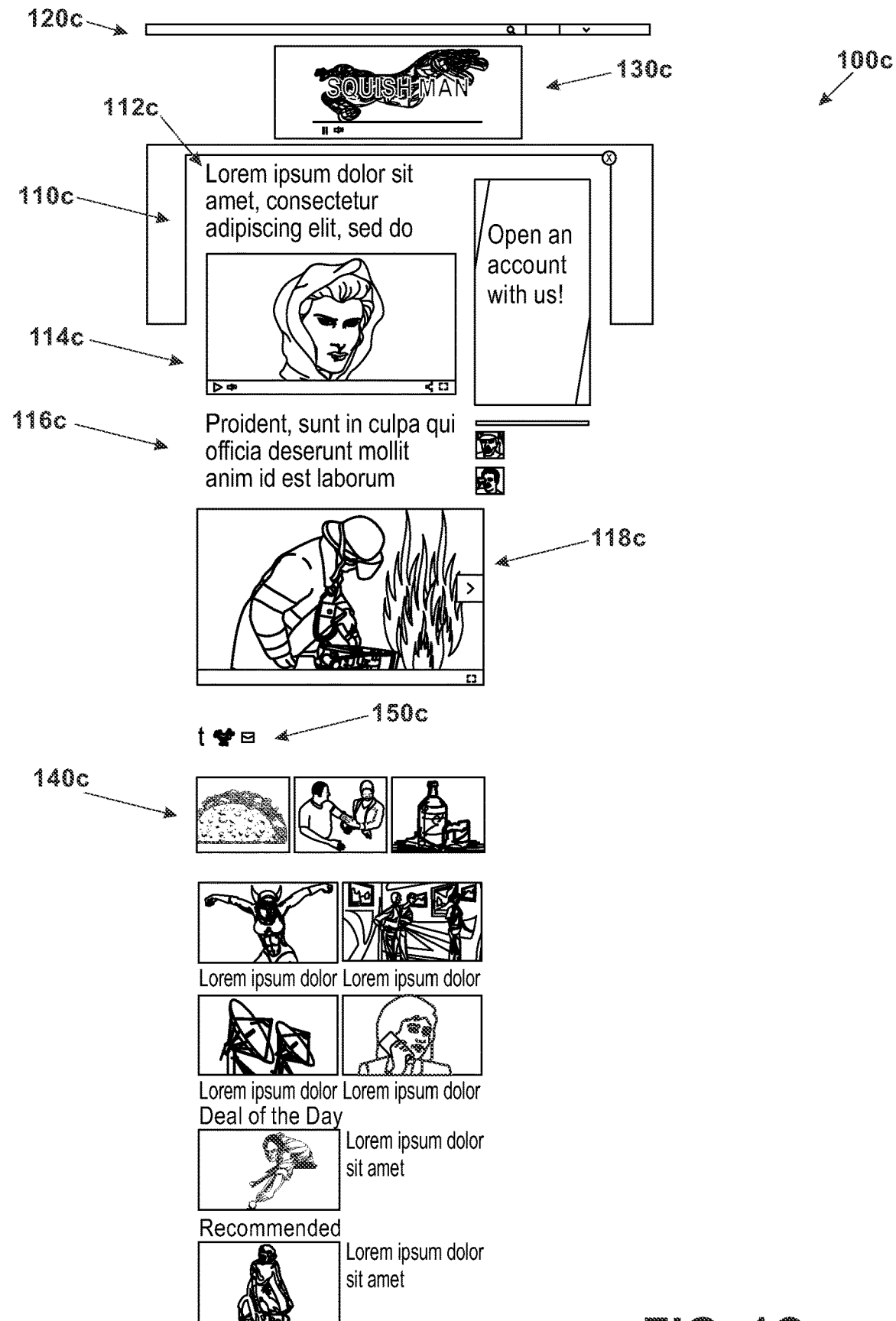

Referring now to FIG. 1C showing a schematic illustration of an exemplary digital content, in accordance with some exemplary embodiments of the disclosed subject matter.

Webpage 100*c* may be an article page, such as a USA TODAY™ article page. Main Article 110*c* is a component that comprises a Title 112*c*, Main Visual Component 114*c*, Article Content 116*c*, and also a Visual Content 118*c*. It is noted that Social Widget 150*c* that is located directly below Main Article 110*c*, may semantically be considered as unrelated to the Main Article 110*c*. Top Menu 120*c* is displayed, as well as a Top Ad Unit 130*c*. Feed Element 140*c* is a seemingly infinite component showing different cards, such as displaying recommendations, advertisements, social widgets, comments widgets, or the like. It is noted that Feed Element 140*c* may keep on loading additional cards as the user scrolls down, providing the seemingly endless content impression. It is further noted that if the text is analyzed, most of the text displayed on the screen is found in Feed Element 140*c* and a topic summarization tool may mistakenly identify a wrong topic if the text in the webpage is analyzed without understanding the different semantic meaning of different elements.

In some exemplary embodiments, based on identifying the semantic meaning of the components of Webpage 100*c*, a web-based visual element may be automatically added to the top of Feed Element 140*c*.

Figure 1D:
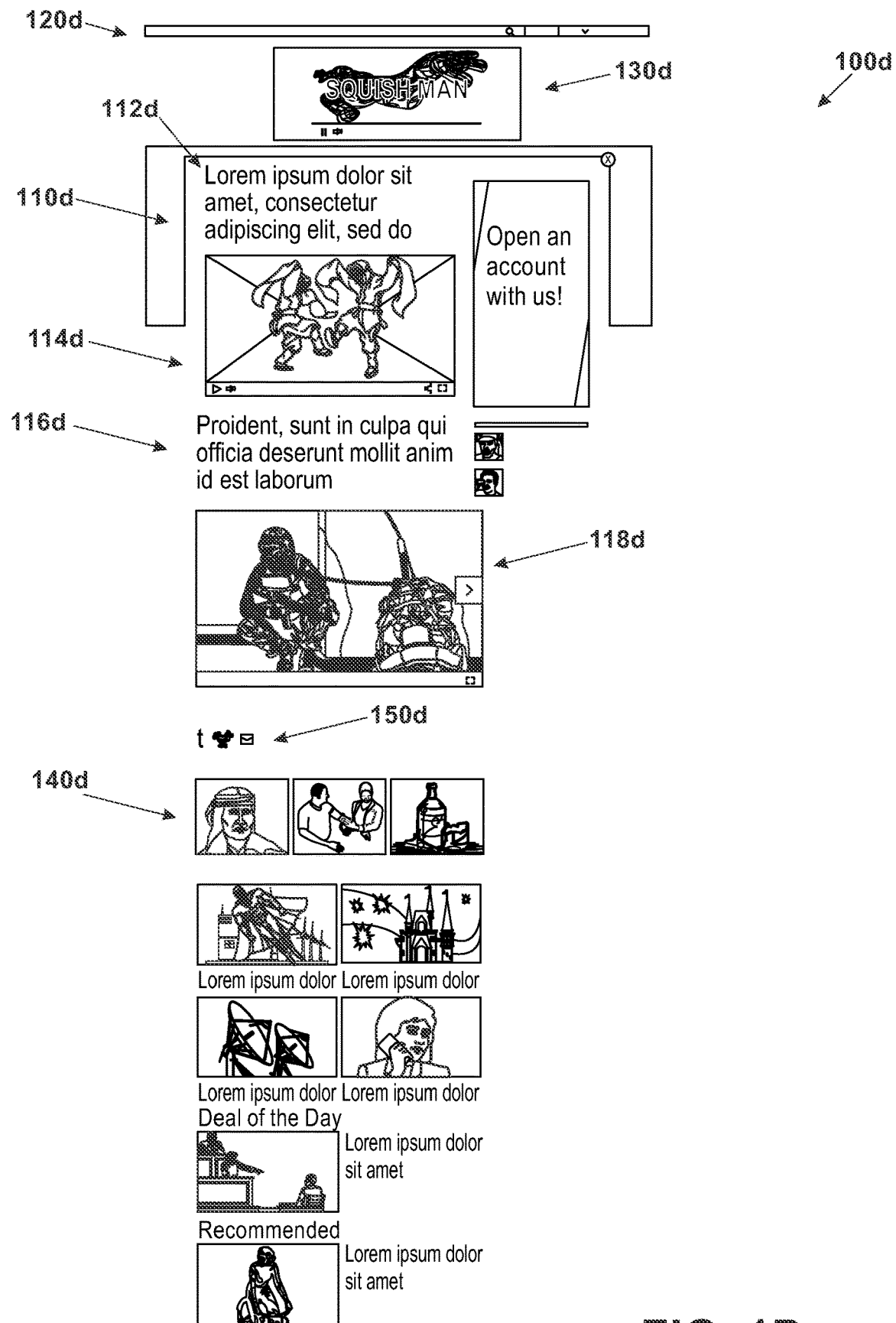

Referring now to FIG. 1D showing a schematic illustration of an exemplary digital content, in accordance with some exemplary embodiments of the disclosed subject matter.

Webpage 100*d* may be a different version of Webpage 100*c*, provided in a later timing. In some exemplary embodiments, Webpage 100*d* may comprise elements similar to Webpage 100*c*, that did not change from the timing of obtaining Webpage 100*c* to the timing of obtaining Webpage 100*d*, such as Top Menu 120*d*, Social Widget 150*d*, Title 112*d* of Main Article 110*d* and Main Visual Component 114*d*. However, some of the components or sub-components may be changed or updated, such as Article Content 116*d* that may be changed due to a user scrawling down while reading the article, or updating the content by the publishers, or the like; Visual Content 118*d* that may be changed due to playing a video or moving to a next image, or the like. It may be noted that Feed Element 140*d* is also changed because of automatically integrating a different visual element thereto.

Figure 2A:
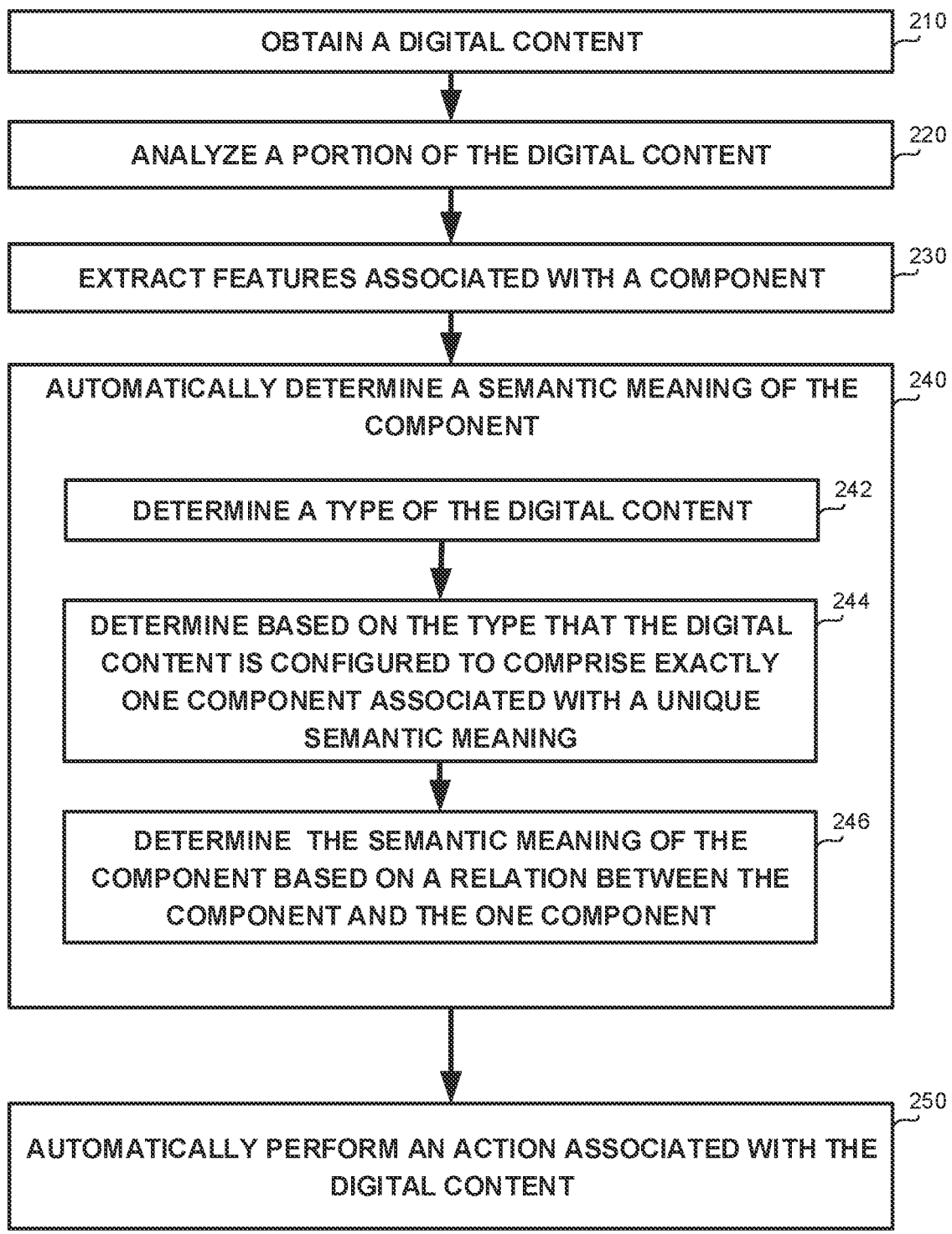
FIGS. 2A-2D show flowchart diagrams of methods, in accordance with some exemplary embodiments of the disclosed subject matter.

Referring now to FIG. 2A showing a flowchart diagram of a method, in accordance with some exemplary embodiments of the disclosed subject matter.

On Step 210, a digital content may be obtained. In some exemplary embodiments, the digital content may be a content provided in the form of digital data. The digital content may comprise information that is digitally broadcast, streamed, or contained in computer files. In some exemplary embodiments, the digital content may be a webpage, being provided by a website and displayed to a user in a web browser, a series of webpages coherent linked together, or the like. The webpage may comprise textual data in text or written format, designed texts, images, videos, or the like. Additionally or alternatively, the digital content may be of other types of formats, such as video content, audio content, or the like, may comprise multiple types of content, such as visual content (photos, images, photo albums, widgets, icons, visual stories, or the like), In some exemplary embodiments, the digital content may comprise multiple visually separated components. The components may be visually separated by being viewed in separated boxes, by being displayed in different formats, structures or designs, or the like.

On Step 220, the digital content or portion thereof may be analyzed. In some exemplary embodiments, the digital content may not be required to be analyzed in its entirety to extract the features.

In some exemplary embodiments, the analysis may separate between different visual elements in accordance with their display. As an example, a <p> HTML tag may not necessarily indicate a new or separated visual element if its content is displayed together with the content of a previous HTML tag. As another example, the analysis may separate between the different visual element based on visual separations, such as borders, colors, type of the content, or the like.

In some exemplary embodiments, analysis of the entire digital content may require substantial amounts of resources and time, and may even, in some cases, not be feasible, such as in digital contents comprising magnitudes of data, "endless" webpages, feeds, or the like. The portion of the digital content may exclude at least a remaining portion of the digital content. Thus, analyzing an entirety of the digital content may be avoided, thereby reducing time and resources required for the analysis. Additionally or alternatively, only a portion of the digital content may be obtainable. As an example, the content may be executed in a separate execution sandbox, such as an iframe HTML element, and access to other elements external to the sandbox may be limited. As another example, parts of the code or content may be blacklisted, whitelisted, associated with different protocols, domains, hosts, origins, or access control levels, thereby restricting certain interactions or access to other content and code, e.g. due to same-origin policy constraints, browser restrictions on access to third-party content and code, and the like. As yet another example, the webpage may dynamically change or continue to be loaded over time. The analysis may be performed on a version of the webpage that may not be a "final" version (if such version exists).

In some exemplary embodiments, the analysis may be based on hard-coded rules, based on hints, or the like. As an example, a hint may that the largest element in the middle of the page is likely the main article. Another hint may be if the visual element has an "Advertisement" or "Sponsored" text next to it, indicating it being an ad unit or a recommendation element. As another example, hints may be obtained from a content publisher, from third-party services, and the like. In some exemplary embodiments, different heuristics may be utilized, such as based on the number of characters or words in an element, based on the semantic meaning of adjacent elements, based on the location of the element, based on sub-elements, their respective location, number, content or the like, based on available buttons and widgets (e.g., X button or "Report Ad" button), based on the HTML tags, attributes or values associated with the component, based on Cascading Style Sheets (CSS) code used by the webpage, based on JavaScript (JS) code used by the webpage, or the like. For example, a client code such as CSS or JS may determine whether and how to display certain elements depending on the circumstances, the screen size, viewport dimensions, user actions, responses from servers, and the like. As an example, if a webpage is configured to possibly hide altogether a certain component in certain circumstances, then the analysis may conclude that this component is less likely to be a "main article".

In some exemplary embodiments, the portion of the digital content to be analyzed for extracting the features may be determined based on properties of the digital content. As an example, redundant or repetitive components may not be analyzed. As another example, collapsed portions that are not configured to be automatically displayed to the user, may not be analyzed. As yet another example, only a screen size rectangle area of the top of a display of the digital content may be analyzed.

On Step 230, features associated with a component from the multiple visually separated components may be extracted. The component may be any component of interest, a component related thereto, or the like. In some exemplary embodiments, the features may be visual features, such as size and shape of the component, the type of content being displayed in the component, a rate of change of pixels in the component, existence or absence of certain icons or images within the component, or the like. Additionally or alternatively, the features may be associated with the relation between the component of interest and other components adjacent thereto, anchor components, elements of the digital content, or the like. The features may be related to the relative location of the component of interest to an anchor component, distance from borders of the digital content, or the like. Additionally or alternatively, the relative location of each visual element may be identified to determine a layout template used in the digital content, such as location of main article, location of feed, location of ad units, or the like.

On Step 240, a semantic meaning of the component may be automatically determined based on the extracted features. In some exemplary embodiments, the semantic meaning may be associated with an intended functionality of the component, intended visual role of the component, intended relation to a content topic of the component, or the like. As an example, it may be determined, such as based on the layout template and based on their content, that there is a main article element in the webpage, that the element in the middle of the page is the main article, that the element with a plurality of cards is a feed element, a top menu element, an ad unit, a sidebar, or the like.

In some exemplary embodiments, semantic meaning of the component may be determined using machine learning mechanisms. The machine learning may be a supervised learning that builds a mathematical model of labeled training dataset. The labeled training dataset may be provided based on manual tagging of semantic meaning to visual elements, based on previously predicted and approved semantic meanings, or the like. Using the labeled training dataset, the supervised learning may be applied to predict semantic meaning in newly introduced digital contents, or digital contents that were not manually tagged, or the like. Additionally or alternatively, the machine learning mechanism may obtain basic information to assist in predicting the semantic meaning, such as a list of visual component of the digital content, their respective locations, their content type or content itself (text or image), or the like. A classifier may be accordingly trained to predict a likelihood of a certain semantic meaning to certain components in future digital contents. As an example, the classifier may be configured to determine with a high likelihood that a component is the main article.

Additionally or alternatively, it may be determined that the component is likely to not have a certain semantic meaning. As an example, a classifier may suggest with high confidence that a certain component is not a "feed" content, is not a "Like" button, or the like. Additionally or alternatively, a classifier may provide a confidence indication in its prediction (e.g., low confidence in its prediction) or not have a prediction altogether of the correct semantic meaning of that component.

In some exemplary embodiments, the semantic meaning may be determined based on features related directly to the component of interest. Additionally or alternatively, the semantic meaning may be determined based on features of other components in the digital content. Additionally or alternatively, the semantic meaning of the component may be determined based on a second semantic meaning of a second component of the digital content, such as based on a relative location, within a rendered graphical representation of the digital content, of the component with respect to the second component. It may be appreciated that the automatic determination is performed without relying on manually inputted hints in the digital content. As an example, the second component may be the largest component of the digital content. Based on extracted features of the second component, it may be determined that the second component is the main component of the digital content and a respective semantic meaning may be associated thereto, such as a main article, a main screen, or the like. The semantic meaning of the component may be determined based on the relative location of the component with respect to the second component within the digital content. As an example, if the component is located directly above the second component, the determined semantic meaning may be related to an introduction of the semantic meaning of the second component, such as a title of the main article, an author thereof, a description of the content being displayed in the main screen, or the like. As another example, if the component is located directly below the second component, the semantic meaning thereof may be related to comments, or the like.

It is noted that components that are visually similar, may not necessarily have the same semantic meaning. For example, two components may appear visually similar, while one is an advertisement and the other is an in-site banner, organic reading recommendation, or the like.

In some exemplary embodiments, a component may be associated with a plurality of potential semantic meanings. A set of candidate semantic meanings related to the component and respective likelihoods of the component having each candidate semantic meaning may be determined. The candidate semantic meanings may depend on the overall context or goals of the digital content. Some candidate semantic meanings may co-exist, may be opposites, may relate to different features, or the like. As an example, a subset of the candidate of semantic meanings may be related to the intended functionality of components another subset may to the intended visual role of the component, to the intended relations to certain content topics, or the like. As an example, the component may be associated with the semantic meaning of being a "main" article, a "feed", a "card" in a feed, a header, a lead visual element, a "call to action", a recommendations component, a social component, an ad unit, holding content of different content topic, or the like.

In some exemplary embodiments, different heuristics may be applied to determine the likelihood of the component having each of the candidate semantic meanings. Based on determined scores or probabilities and the set of candidate semantic meanings, the most likely semantic meaning may be determined. However, it may be noted that the selected semantic meaning may not necessarily be the semantic meaning having the highest likelihood, such as in a case of a semantic meaning that has to be associated with a singular component in a page, such as the main article or a top menu. Hence, the element most likely to have such semantic meaning may be selected to have that meaning, while all others may be selected different meanings.

Additionally or alternatively, the determination of the semantic meaning of the component may be further performed based on a type of the digital content. As an example, an article webpage may comprise a main article component, usually the largest component, the component below the webpage title, or the like. As another example, a search engine page may comprise a search bar, a search widget, or the like.

On Step 242, a type of the digital content may be determined based on the analysis. In some exemplary embodiments, the type of the digital content may be determined based on the format of the digital content, such as a webpage, a video app, or the like, may be determined based on the ornamental layout of the webpage, or the like. Additionally or alternatively, the type of the digital content may be related to the content, such as article pages, news webpages, search results pages, questions and answers sites, web mapping, or the like.

On Step 244, a determination that the digital content is configured to comprise exactly one component that is associated with a unique semantic meaning, may be performed. The determination may be performed based on the type of the digital content. As an example, an article page or a news webpage may be configured to comprise a single "main article". As another example, a search app screen or a search results page may be configured to comprise a single component having the unique semantic meaning of a search widget of the search results page, a search line, or the like. As yet another example, a media player app or webpage may be configured to comprise a single playing screen.

On Step 246, the semantic meaning of the component may be determined based on a relation between the one component and the component. In some exemplary embodiments, the relation may be the relative location or distance from the one component. As an example, a component located directly above the main article may be a title thereof. Additionally or alternatively, the semantic meaning of the component may be determined not to be the unique semantic meaning, despite having the highest likelihood, based on identifying that the one component is the component having the unique semantic meaning.

Additionally or alternatively, the semantic meaning of the component may be determined based on the type of the digital content. As an example, a component comprising text in an article page, such as a news webpage, digital newspaper, or the like, may be an article. The largest component may be the main articles. As another example, the main content in a web mapping site (such as MapQuest™, Google™ Maps, Waze™ or the like) may be the map.

On Step 250, an action associated with the digital content may be performed automatically and without user intervention. In some exemplary embodiments, the action may be determined based on the semantic meaning of the content.

In some exemplary embodiments, the action may be to automatically integrate web-based components into the digital content, such as integrating ads or extensions into an existing webpage, without user or expert intervention. (See FIG. 2B)

Additionally or alternatively, the action may be to ensuring that the digital content meets pre-determined requirements, such as derived from requirements, contractual obligations, or the like. (See FIG. 2C).

Additionally or alternatively, the action may comprise providing the results of the analysis and the determined sematic meanings to advanced analytics services, crawling services, or the like. Such tools may be configured to provide topic summarization of the digital content based on the content of certain components having specific semantic meaning. As an example, elements having semantic meaning of "feed", "ad unit" or the like, may be ignored for topic summarization analysis. Additionally or alternatively, the analysis may be focused on the content of the component identified as having the semantic meaning of "main article". As another example, in case there are a plurality of elements with "main article" semantic meaning, such as in case of a homepage of a news website, the analysis may be based on the topic summary of each such component. In some exemplary embodiments, a common topic of all topics may be identified, such as "sports" in case of a sports news website, even though all specific topics are identified as relating to specific sports events that are covered in the website.

Figure 2B:
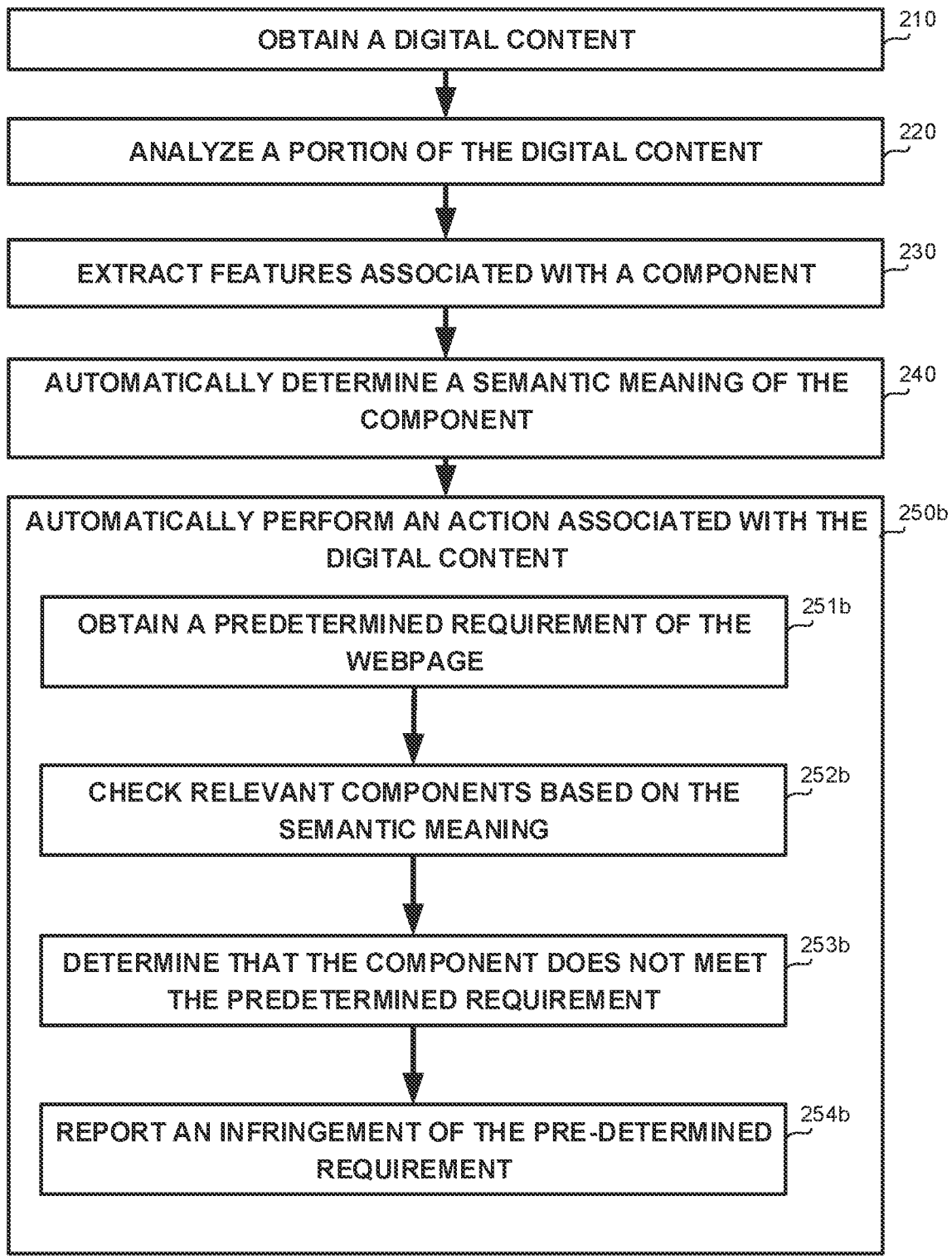

Referring now to FIG. 2B showing a flowchart diagram of a method, in accordance with some exemplary embodiments of the disclosed subject matter.

In some exemplary embodiments, the action performed on Step 250 may be determining whether the digital content meets pre-determined requirements (Step 250b).

On Step 251b, a predetermined requirement of the digital content may be obtained. In some exemplary embodiments, the pre-determined requirement may comprise ornamental requirements, such as complying with predefined structure of a website, contractual obligations and standards, or the like; logical requirements such as industry best practices, economically preferred actions, or the like; regulation requirements such as indicating a "sponsored" content, "18+" warning for adults' content, or the like. In some exemplary embodiments, the predetermined requirement may be related to the semantic meaning of the component, may be a requirement of components having the semantic meaning, or the like. Additionally or alternatively, the pre-determined requirement may be a requirement of the whole digital content, of other components of the digital contain, or the like.

On Step 252b, relevant components to the pre-determined requirement may be checked and analyzed. As an example, the component associated with a semantic meaning may be determined to be related to pre-determined requirement, based on having the semantic meaning, based on the semantic meaning being related to the predetermined requirement, or the like. The component may be automatically investigated to check whether the component or components related thereto, meet the pre-determined requirement, based on the semantic meaning thereof.

On Step 253b, a determination that the component does not meet the predetermined requirement may be performed.

As an example, a recommendation feed, such as provided by Taboola™, may be a component in which a plurality of automatically served recommendations (organic, sponsored, or the like) and other "cards" of content may be provided to the user. It may be agreed upon that the recommendation feed be placed below the main article in the webpage, no more than 100 pixels vertically from the end of the main article. As another example, it may be agreed upon that there will be no more than a single advertisement component in the webpage. It may be desired to ensure that no more than a single sidebar is displayed. As another example, Interactive Advertising Bureau (IAB) regulations require that each advertising component be accompanied by a "sponsored content" text or other visual indications.

On Step 254b, an infringement of the pre-determined requirements may be reported.

Figure 2C:
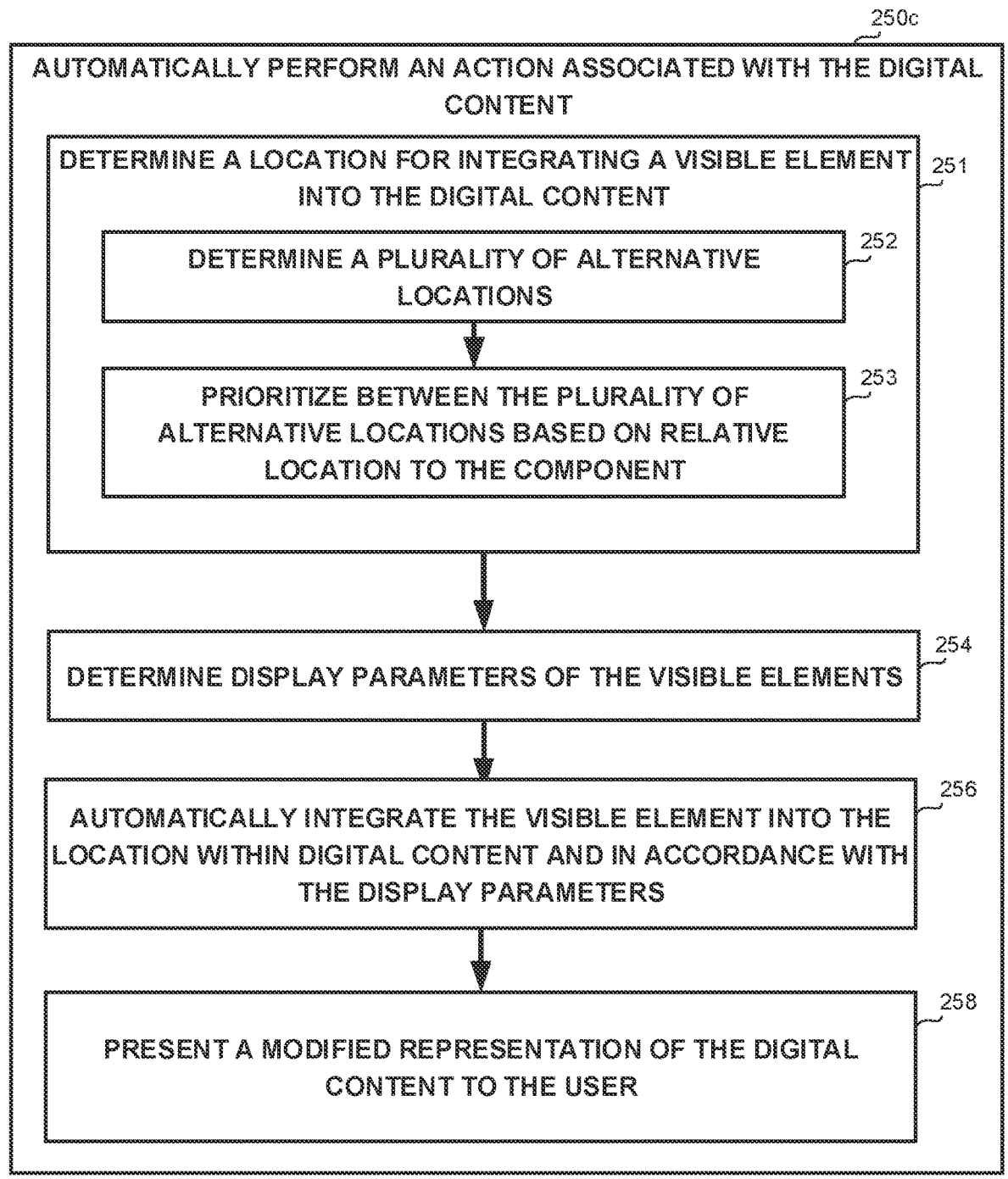

Referring now to FIG. 2C showing a flowchart diagram of a method, in accordance with some exemplary embodiments of the disclosed subject matter.

In some exemplary embodiments, the automatically performed action performed in Step 250 may comprise an automatic integration of a visible element, such as a web based component, into the digital content. As an example, the action may comprise automatically identifying an opportunity to insert an ad unit component to a webpage, an opportunity to add social interaction widgets into a website, or the like. As another example, it may be desired to automatically display a Twitter™ "retweet" button for specific users, such as those users identified by the provider of the component or using information provided by the developer of the publisher website, as users that are likely to interact with such "retweet" buttons.

On Step 251, a location within the digital content to integrate the visible element therein, may be determined based on the semantic meaning of the component. In some exemplary embodiments, the location may be the same location as the component, may be different than a location of the component, may overlap with the component, or the like.

Additionally or alternatively, the location may be selected over a plurality of alternative locations suitable for integrating the visible element, such as the location with the highest likelihood of having the semantic meaning, the location with the less costs, or the like.

In some exemplary embodiments, the automatic identification of the location or the plurality of alternative locations may speed up and improve the integration of the visible element into the digital content. Additionally or alternatively, the automated integration may provide a personalized user experience (UX) to the user without the involvement of the user.

On Step 252, the plurality of alternative locations within the digital content suitable for integrating the visible element may be determined.

On Step 253, a prioritization between the plurality of alternative locations may be performed based on relative location thereof to the component. In some exemplary embodiments, the prioritization may be performed based on a score provided to each location based on UX considerations, user preferences, historic analytics data (e.g., a-b testing and its results; behavior of similar users) or the like. In some exemplary embodiments, the disclosed subject matter may provide a personalized UX for the user based on his or her properties and based on the user's expected behavior in the webpage or in the publisher's website. Different users may be provided with different UX that is considered as best suiting each one of them.

On Step 254, display parameters of the visible element may be determined based on the semantic meaning of the component. In some exemplary embodiments, the display parameters may comprise a timing of integrating the visible element, visual adjustments required for the display, or the like. As an example, a button may be displayed for different views of the same webpage in a different size, a different design, below or above an article element in the webpage, or the like. Additionally or alternatively, the display parameters may be related to the manner in which the visible element is configured to be displayed. Additionally or alternatively, the display parameters may further depend on characteristics of other elements in the digital content, based on semantic meaning of other components, or the like. As an example, the display parameters may comprise a size, design, angle, or the like. e.g., a button may be displayed for different views of the same webpage in a different size, a different design, below or above an article element in the webpage, or the like.

On Step 256, the visible element may be automatically integrated in the location within the digital content, in accordance with the display parameters.

In some exemplary embodiments, integrating the visible element into the digital content may be performed efficiently without requiring human labor of engineers or other developers, without requiring manual identification of locations to integrate the element, or the like. Additionally or alternatively, the integration of the visible element may be partially or semi-automatic. As an example, the location may be automatically identified based on the semantic meaning, while the actual integration may be performed after human expert approval.

In some exemplary embodiments, the integration may be performed in real-time using client-side code invoking the analysis and the insertion of the new element into the Document Object Model (DOM) file of the existing digital content. Hence, the integration may simply require adding a code that invokes an on-the-fly code injection automatically, without requiring manual labor to identify the correct location and place the new component manually. In some cases, by adding the code to a standard header or footer of a digital content, the entire integration may be performed by simply adding the code to a template code that is duplicated over an entire digital content. In some semi-automatic embodiments, a manual involvement may be used to approve the code insertions as suggested by the automatic analysis, or to modify them, or to select between two or more such suggestions.

In some exemplary embodiments, the code injection may be performed on the fly and in response to an on-the-fly determination. For example, the code may determine whether or not to display a social media widget as part of the webpage, when displayed to a specific user, based on the properties of the specific user. In some cases, the user may be identified as having a social media account and the widget may be displayed. In other cases, the user may be identified as a user having a low likelihood of interacting with the social media widget, and the widget may not be displayed. In some exemplary embodiments, the determination may be based on information determined and gathered by the publisher website and provided to the provider of the server, by the provider of the service directly, or the like.

On Step 258, a modified representation of the digital content may be presented to a user consuming the digital content.

Figure 2D:
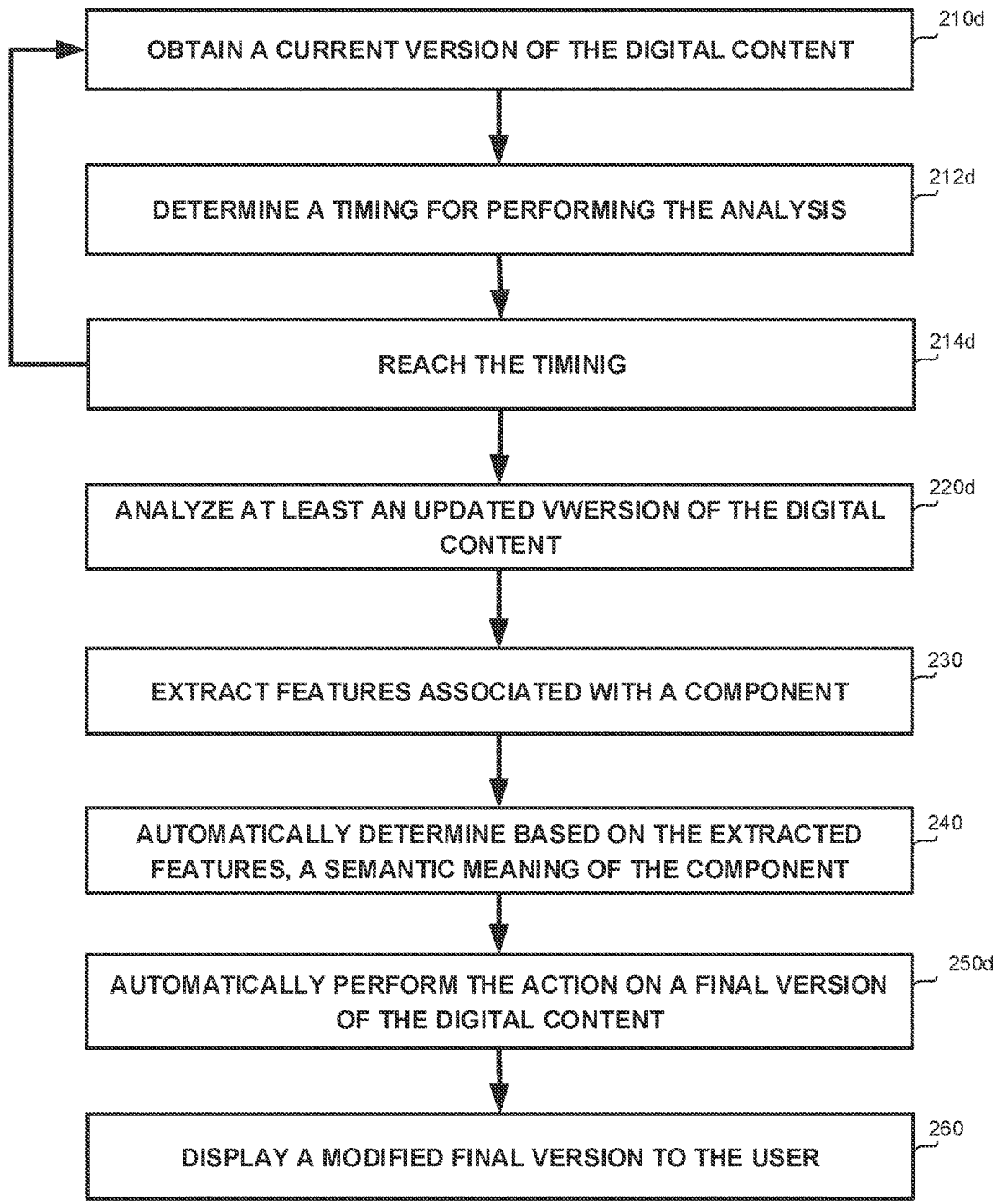

Referring now to FIG. 2D showing a flowchart diagram of a method, in accordance with some exemplary embodiments of the disclosed subject matter.

In some exemplary embodiments, the digital content may be a dynamic digital content having different versions over time. As an example, the digital content may be a webpage being updated over time. Additionally or alternatively, the digital content may be too large, such as an endless feed, whose content may exceed the currently displayed content, and may cause an automatic text analysis to provide an incorrect estimation as to the topic of the digital content or the semantic meaning of a certain component.

On Step 210d, a current version of the digital content may be obtained. In some exemplary embodiments, the current version of the digital content being analyzed may be a non-final version of the digital content different than a final version of the digital content that is configured to be displayed to the user.

On Step 212d, a timing for performing the analysis may be determined based on properties of the dynamic digital content. It may be noted that the action (see below Step 250d) may be designated to be performed on the final version, however, the final version may not be available at a time of the analysis. Accordingly, it may be required to select a timing for performing the analysis that guarantees an efficient performance of the action on the final version.

In some exemplary embodiments, the timing may be a time of reaching a version that is closed or similar to the "end result" to be previewed to the user, or potential final version of the digital content.

In some exemplary embodiments, the timing may be determined after a period of time elapses, periodically, in response to events or lack thereof, in response to user actions or lack thereof, in response to "responsiveness" events or other changes of the layout or presentation of content, in response to communication with a server such as third-party servers, to execution of client code, or the like. As an example, a static webpage may be identified to have finished loading and an "end result" or a "final version" may be identified. As another example, a feed element may continue to fetch additional data when the user scrolls down. As a result, the page may be potentially always change and be updated and there may not be any specific, easily recognizable or single "end result".

Additionally or alternatively, the timing may be determined by heuristics, rules, or the like. In some exemplary embodiments, the timing may be determined based on a time elapsed since the page was started to be loaded. Additionally or alternatively, the timing may be determined based on a number of server-side requests that were invoked and responded to by the web page, such as after at least about 10, 50, 70, 100, or the like queries were invoked and their response was received. Additionally or alternatively, the timing may be determined based on a rate of server-side queries. In some cases, the rate of server-side queries when the page is loaded may initially be high and then may reduce to a point where the page is occasionally updated due to user activity. As an example, the analysis may be performed after there are 5, 10, 20 or the like seconds in which no additional client-side or server-side query is invoked (e.g., initially, there are many queries invoked in a short time duration, until there is a time period of five seconds in which no additional query is invoked). In some exemplary embodiments, the determination may be based on the target of the queries. As an example, in case advertisement rules are enforced, it may be desired to perform the analysis only after all the ads are served, after each server responds, after execution of client code in relation to the ads, or the like. Ads may be served in response to server queries aimed at an ad network server. There may be a list of potential ad servers, such as a general list of all known ad servers, a list of ad servers that are used by the specific publisher who owns the webpage, or the like. The analysis may be deferred until at least one query to the servers in the list receives a response. Additionally or alternatively, the analysis may be deferred until all queries to the servers in the list receive a response. As an example, it may be required that at least one ad-related query is invoked and responded to. However, if until the first query receives a response, additional ad queries are invoked, the analysis may be delayed until all such queries receive responses.

On Step 220d, in response to reaching the timing (Step 214e), the analysis may be performed on a current version of the digital content (e.g., a version at the timing). Additionally or alternatively, the analysis may be performed on aggregated version generated based on data obtained until that point in time.

Additionally or alternatively, the analysis and determination of the semantic meaning may be performed periodically, and a determination process or analysis may be performed more than once.

On Step 250*d*, the action may be performed on a final version of the digital content, whereby generating a modified final version to be displayed to a user on Step 260.

Figure 3:
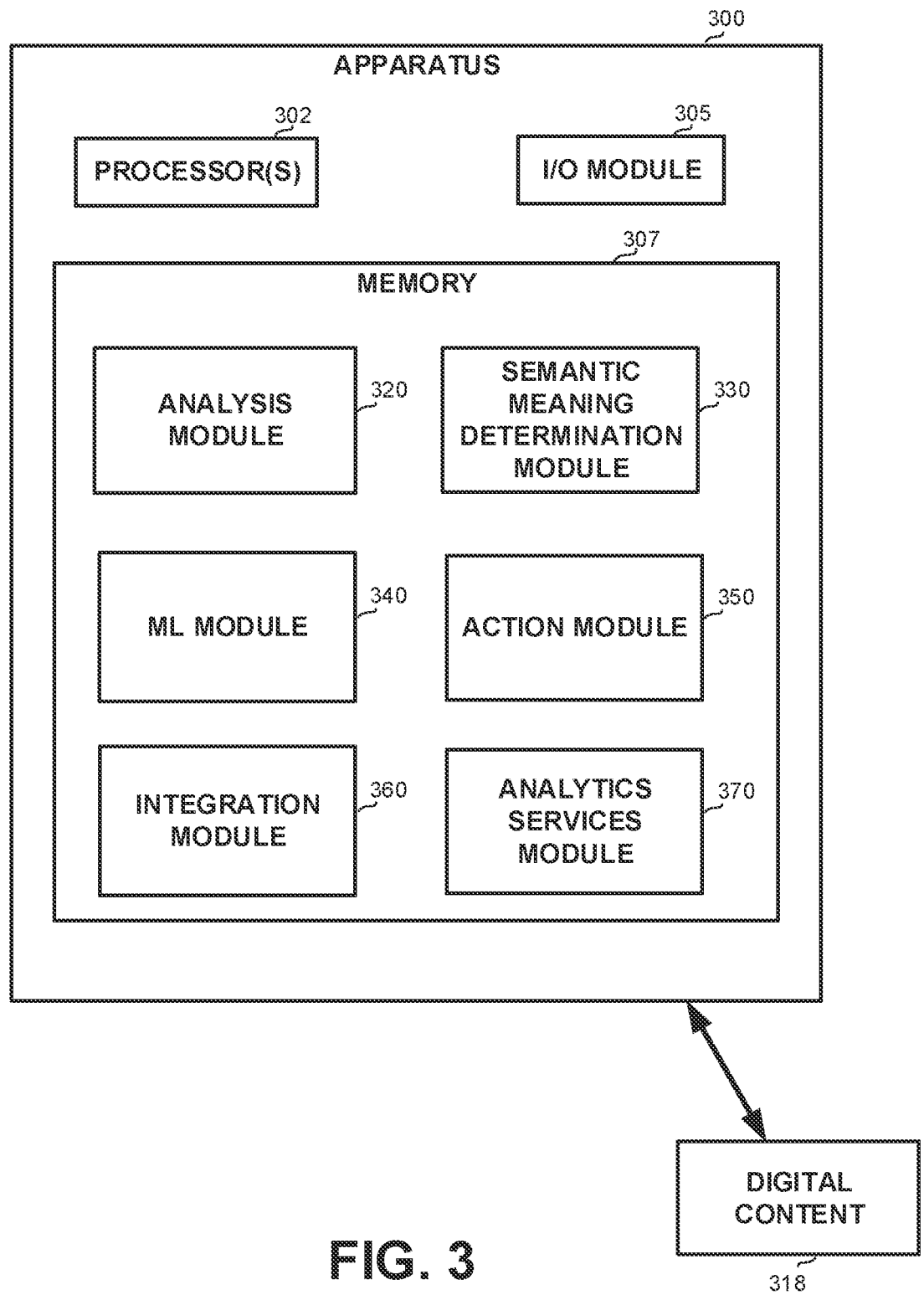
FIG. 3 shows a block diagram of an apparatus, in accordance with some exemplary embodiments of the disclosed subject matter.

Referring now to FIG. 3 showing a block diagram of an apparatus, in accordance with some exemplary embodiments of the disclosed subject matter. An Apparatus 300 may be configured to support parallel user interaction with a real world physical system and a digital representation thereof, in accordance with the disclosed subject matter.

In some exemplary embodiments, Apparatus 300 may comprise one or more Processor(s) 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents.

In some exemplary embodiments of the disclosed subject matter, Apparatus 300 may comprise an Input/Output (I/O) module 305. I/O Module 305 may be utilized to provide an output to and receive input from a user, such as, for example reporting infringements to a user, providing modified digital content, or the like.

In some exemplary embodiments, I/O Module 305 may be configured to obtain a Digital Content 318, such as the digital contents illustrated in FIGS. 1A-1D. Digital Content 318 may comprise multiple visually separated components. Additionally or alternatively, I/O Module 305 may be configured to obtain a pre-determined requirement associated with Digital Content 318.

In some exemplary embodiments, Apparatus 300 may comprise Memory 307. Memory 307 may be a hard disk drive, a Flash disk, a Random Access Memory (RAM), a memory chip, or the like. In some exemplary embodiments, Memory 307 may retain program code operative to cause Processor 302 to perform acts associated with any of the subcomponents of Apparatus 300.

In some exemplary embodiments, Analysis Module 320 may be configured to analyze at least a portion of Digital Content 318. Analysis Module 320 may be configured to identify visually separated components within Digital Content 318 and extract features associated therewith.

In some exemplary embodiments, Analysis Module 320 may be configured to automatically determine the at least portion of Digital Content 318 to be analyzed. Additionally or alternatively, in case of Digital Content being a dynamic digital content having different versions over time, Analysis Module 320 may be configured to determine a timing for obtaining a version of Digital Content 318 and analysis thereof. Analysis Module 320 may be configured to perform the analysis only when reaching the timing.

In some exemplary embodiments, Analysis Module 320 may be configured to determine a type of Digital Content 318. The type of semantic meaning may be an article page, a search results page, an image sharing page, an item on a sale page, a login page, a collection page comprising several articles with associated summary, or the like.

In some exemplary embodiments, Semantic Meaning Determination Module 330 may be configured to automatically determine a semantic meaning of each component of interest in Digital Content 318. The semantic meaning may be associated with an intended functionality of the component, an intended visual role of the component, an intended relation to a content topic of the component, or the like.

In some exemplary embodiments, Semantic Meaning Determination Module 330 may be configured to automatically determine the semantic meaning based on features of the component or other analysis results of Analysis Module 320. Additionally or alternatively, Semantic Meaning Determination Module 330 may be configured to automatically determine the semantic meaning of a component based on a relation to another component having a certain semantic meaning. The semantic meaning of the component may be determined based on a relative location, within a rendered graphical representation of Digital Content 318, of the component with respect to the other component. Additionally or alternatively, In some exemplary embodiments, Semantic Meaning Determination Module 330 may be configured to determine the semantic meaning based on rules such as a relative size of the component compared to other components of the multiple visually separated components within Digital Content 318, a relative location compared to another component having a meaning of a title of an article, existence or lack thereof of one or more images within a content of the component, which semantic meanings are obligatory within the page (or pages of such type), which semantic meanings are unique within the page (or pages of such type) or the like.

In some exemplary embodiments, Semantic Meaning Determination Module 330 may be configured to determine for each component of interest, a set of candidate semantic meanings related thereto and respective likelihoods of the component having each candidate semantic meaning. The semantic meaning of each component may be selected from the set of candidate semantic meanings based on the likelihood of available semantic meanings.

In some exemplary embodiments, Semantic Meaning Determination Module 330 may be configured to determine the candidate semantic meanings of the components of interest based on the type of Digital Content 318. Semantic Meaning Determination Module 330 may be configured to determine that based on Digital Content 318 being of a certain type, it is designated to comprise exactly one component associated with a unique semantic meaning. Semantic Meaning Determination Module 330 may be configured to identify the component associated with the unique semantic meaning and automatically determine the semantic meaning of other components based on a relation between the exactly one component and the other components. In some exemplary embodiments, Semantic Meaning Determination Module 330 may be configured to identify all the components having the unique semantic meaning in their set of candidate semantic meanings as the component with the highest likelihood, and select the most likely component to be associated with the unique semantic meaning to be the exactly one component. In such case, the semantic meaning of other components may be selected as the second likely semantic meaning from the respective set of candidate semantic meanings. As an example, if Digital Content 318 is an article page, the unique semantic meaning may be a main article of the article page. As another example, if Digital Content 318 is a search results page, the unique semantic meaning may be a search widget of the search results page.

In some exemplary embodiments, Semantic Meaning Determination Module 330 may be configured to utilize a ML Module 340 for determining the semantic meanings. ML Module 340 may be configured to apply supervised machine learning techniques on Digital Content 318 or on the result of Analysis Module 320 (such as the components of interest, extracted features of Digital Content 318, features of the component of interest, or the like) to predict the semantic meaning.

In some exemplary embodiments, Action Module 350 may be configured to perform an action associated with Digital Content 318. The action may be performed automatically and without user intervention. Action Module 350 may be configured to determine the action and other parameters related thereto based on the semantic meaning of relevant components.

In some exemplary embodiments, Action Module 350 may be configured to utilize Integration Module 360 to integrate a visible element into Digital Content 318. Integration Module 360 may be configured to automatically integrating the visible element into Digital Content 318. The visible element may be a web-based component, such as an ad, a content suggestion, or the like. Integration Module 360 may be configured to generate a modified representation of Digital Content 318 to be presented to a user consuming Digital Content 318. The modified representation may comprise the visible element in the most efficient manner.

In some exemplary embodiments, Integration Module 360 may be configured to determine, based on the semantic meaning of the components of interest, a location within Digital Content 318 to integrate the visible element. Integration Module 360 may be configured to determine the location based on a relative location to a location of a component of interest, such as a relative location to a main article, a relative location to a feed card, or the like. Additionally or alternatively, Integration Module 360 may be configured to determine a plurality of alternative locations within Digital Content 318 suitable for integrating the visible element, and prioritize therebetween based on relative location thereof to the component. Integration Module 360 may be configured to cause the visible element to be integrated in the location within Digital Content 318.

In some exemplary embodiments, Integration Module 360 may be configured to determine one or more display parameters of integrating the visible element into a certain location of Digital Content 318 based on the semantic meaning of the component related to the certain location.

Additionally or alternatively, Action Module 350 may be configured to utilize Analytic Services Module 370 to perform an advanced analysis of Digital Content 318 in accordance with the determined semantic meanings. Analytic Services Module 370 may be configured to identify components of Digital Content 318 that are associated with semantic meanings related to pre-determined requirements or rules associated of Digital Content 318. Analytic Services Module 370 may be configured to automatically determine whether such components or Digital Content 318 meet the pre-determined requirements. Additionally or alternatively, Analytic Services Module 370 may be configured to additional analysis result of Digital Content 318, such as analysis of Digital Content 318 based on the content of certain components having specific semantic meaning.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    obtaining a digital content, the digital content comprises multiple visually separated components, wherein the multiple visually separated components comprise a component;
    automatically analyzing at least a portion of the digital content to extract features associated with the component;
    automatically determining, based on the extracted features a semantic meaning of the component, wherein said automatically determining is performed without using manually inputted hints in the digital content;
    automatically and without user intervention, performing an action associated with the digital content, wherein the action is determined based on the semantic meaning of the component and either an automatically determined parameter or a predetermined requirement, both associated with the digital content and based on said analyzing, and wherein the action comprises at least one of:
    (i) automatically integrating a visible element into the digital content, wherein a location or presentation of the visible element is automatically determined based on the semantic meaning or said parameter; or
    (ii) automatically adjusting the digital content based on the semantic meaning of the component or to satisfy said predetermined requirement; and
    wherein said method is performed without utilizing manual hints provided by a user.

2. The method of claim 1, wherein the multiple visually separated components further comprise a second component, wherein said automatically determining the semantic meaning comprises:
    determining, based on the extracted features, a second semantic meaning of the second component, wherein the second semantic meaning is different than the semantic meaning; and
    determining the semantic meaning of the component based on the second semantic meaning of the second component.

3. The method of claim 2, wherein said automatically determining the semantic meaning of the component is performed based on a relative location, within a rendered graphical representation of the digital content, of the component with respect to the second component.

4. The method of claim 1, further comprises:
    determining, based on said analyzing, a type of the digital content;
    wherein said automatically determining the semantic meaning of the component is further performed based on the type of the digital content.

5. The method of claim 4, further comprises:
    determining, based on the type of the digital content, that the digital content is configured to comprise a second component associated with a unique semantic meaning, wherein the digital content comprises exactly one component that is associated with the unique semantic meaning;

wherein said automatically determining the semantic meaning of the component is performed based on a relative location within a rendered graphical representation of the digital content, of the component with respect to the second component.

6. The method of claim 5, wherein the type of the digital content is an article page, wherein the unique semantic meaning is a main article of the article page.

7. The method of claim 5, wherein the type of digital content is a search results page, wherein the unique semantic meaning is a search widget of the search results page.

8. The method of claim 1, wherein the action comprises said automatically integrating the visible element into the digital content, wherein said automatically integrating the visible element comprises automatically determining a plurality of alternative locations within the digital content, each of which is suitable for integrating the visible element, and prioritizing therebetween based on at least one of: a relative location to another component, a score provided to each location, user preferences, or historic analytics data.

9. The method of claim 8, wherein said automatically integrating comprises:
determining, based on the semantic meaning of the component, a location within the digital content to integrate the visible element, wherein the location is determined based on a relative location to a location of the component; and
causing the visible element to be integrated in the location within the digital content.

10. The method of claim 9, wherein said determining the location comprises:
determining a plurality of alternative locations within the digital content suitable for integrating the visible element; and
prioritizing between the plurality of alternative locations based on relative location thereof to the component.

11. The method of claim 1, wherein the action comprises said automatically integrating the visible element into the digital content, wherein said automatically integrating the visible element into the digital content is performed in accordance with one or more display parameters, wherein the one or more display parameters are determined based on the semantic meaning of the component.

12. The method of claim 1, wherein the action further comprises:
obtaining the pre-determined requirement for components having the semantic meaning;
automatically determining that the component does not meet the pre-determined requirement; and
automatically reporting infringement of the pre-determined requirement.

13. The method of claim 12, wherein the pre-determined requirement comprises at least one of: an ornamental requirement and a logical requirement.

14. The method of claim 1, wherein the semantic meaning is associated with an intended functionality of the component.

15. The method of claim 1, wherein said automatically determining the semantic meaning is performed based on at least one of the following rules:
a relative size of the component compared to other components of the multiple visually separated components;

a relative location compared to another component having a meaning of a title of an article; and
existence or lack thereof of one or more images within a content of the component.

16. The method of claim 1, wherein said obtaining the digital content comprises obtaining a first version of the digital content, wherein said analyzing the at least portion of the digital content and said automatically determining the semantic meaning of the component are performed with respect to the first version; wherein the method further comprises: obtaining a second version of the digital content, wherein the second version is obtained after the semantic meaning of the component is determined; and wherein the action is performed with respect to the second version of the digital content.

17. The method of claim 1 further comprises:
determining the at least portion of the digital content to be analyzed for extracting the features, wherein the at least portion of the digital content excludes at least a remaining portion of the digital content, whereby avoiding analyzing an entirety of the digital content.

18. The method of claim 1, wherein the digital content is dynamic, and said analyzing is performed on dynamically generated content.

19. An apparatus having a processor, the processor being adapted to perform the steps of:
obtaining a digital content, the digital content comprises multiple visually separated components, wherein the multiple visually separated components comprise a component;
automatically analyzing at least a portion of the digital content to extract features associated with the component;
automatically determining, based on the extracted features, a semantic meaning of the component, wherein said automatically determining is performed without using manually inputted hints in the digital content;
automatically and without user intervention, performing an action associated with the digital content, wherein the action is determined based on the semantic meaning of the component, and either an automatically determined parameter or a predetermined requirement, both associated with the digital content and based on said analyzing, and wherein the action comprises at least one of:
(i) automatically integrating a visible element into the digital content, wherein a location or presentation of the visible element is automatically determined based on the semantic meaning or said parameter; or
(ii) automatically adjusting the digital content based on the semantic meaning of the component or to satisfy said predetermined requirement; and
wherein said method is performed without utilizing manual hints provided by a user.

20. The apparatus of claim 19, wherein the multiple visually separated components further comprise a second component, wherein said automatically determining the semantic meaning comprises:
determining, based on the extracted features, a second semantic meaning of the second component; and
determining the semantic meaning of the component based on the second semantic meaning of the second component.

21. The apparatus of claim 19, wherein said automatically determining the semantic meaning of the component is further performed based on a type of the digital content, wherein said apparatus is configured to automatically determine the type of the digital content.

22. The apparatus of claim 19, wherein the action comprises said automatically integrating the visible element into the digital content, wherein said automatically integrating the visible element comprises automatically determining a plurality of alternative locations within the digital content, each of which is suitable for integrating the visible element, and prioritizing therebetween based on at least one of: a relative location to another component, a score provided to each location, user experience considerations, user preferences, or historic analytics data.

23. The apparatus of claim 19, wherein the action comprises:
   obtaining the pre-determined requirement for components having the semantic meaning;
   automatically determining that the component does not meet the pre-determined requirement; and
   automatically reporting infringement of the pre-determined requirement.

24. The apparatus of claim 19, wherein said automatically determining the semantic meaning is performed based on at least one of the following rules:
   a relative size of the component compared to other components of the multiple visually separated components;
   a relative location compared to another component having a meaning of a title of an article; and
   existence or lack thereof of one or more images within a content of the component.

25. A computer program product comprising a non-transitory computer readable storage medium retaining program instructions, which program instructions when read by a processor, cause the processor to perform a method comprising:
   obtaining a digital content, the digital content comprises multiple visually separated components, wherein the multiple visually separated components comprise a component;
   automatically analyzing at least a portion of the digital content to extract features associated with the component;
   automatically determining, based on the extracted features, a semantic meaning of the component, wherein said automatically determining is performed without using manually inputted hints in the digital content;
   automatically and without user intervention, performing an action associated with the digital content, wherein the action is determined based on the semantic meaning of the component, and either an automatically determined parameter or a predetermined requirement, both associated with the digital content and based on said analyzing, and wherein the action comprises at least one of:
   (i) automatically integrating a visible element into the digital content, wherein a location or presentation of the visible element is automatically determined based on the semantic meaning or said parameter; or
   (ii) automatically adjusting the digital content based on the semantic meaning of the component or to satisfy said predetermined requirement; and
   wherein said method is performed without utilizing manual hints provided by a user.

* * * * *